United States Patent [19]

Ayata et al.

[11] Patent Number: 4,737,804

[45] Date of Patent: Apr. 12, 1988

[54] COPYING APPARATUS

[75] Inventors: Naoki Ayata, Yokohama; Yasushi Sato, Kawasaki; Seiji Saito, Yokohama; Noboru Koumura, Narashino; Motoharu Fujii, Tokyo, all of Japan

[73] Assignee: Canon Kabushiki Kaisha, Tokyo, Japan

[21] Appl. No.: 921,863

[22] Filed: Oct. 22, 1986

Related U.S. Application Data

[63] Continuation of Ser. No. 73,488, Sep. 7, 1979, abandoned.

[30] Foreign Application Priority Data

Sep. 12, 1978 [JP] Japan ............................... 53-112111
Sep. 22, 1978 [JP] Japan ............................... 53-117306

[51] Int. Cl.[4] ............................................ G01D 15/06

[52] U.S. Cl. .................................... 346/153.1; 355/7; 358/300

[58] Field of Search ......................... 355/3 R, 14 R, 7; 358/296, 300; 346/75, 154, 153.1

[56] References Cited

U.S. PATENT DOCUMENTS

| | | | |
|---|---|---|---|
| 3,103,849 | 9/1963 | Wise | 355/40 X |
| 3,698,006 | 10/1972 | Ovshinsky | 354/7 X |
| 3,928,718 | 12/1975 | Sagae et al. | 358/296 |
| 4,009,954 | 3/1977 | Ritzerfeld | 355/7 |
| 4,094,606 | 6/1978 | Camphausen | 355/3 R |
| 4,106,061 | 8/1978 | Burnett | 358/296 |
| 4,155,103 | 5/1979 | Gamblin et al. | 358/296 |
| 4,215,929 | 8/1980 | Sato et al. | 355/7 |
| 4,268,164 | 5/1981 | Yajima et al. | 355/7 X |
| 4,325,086 | 4/1982 | Sato et al. | 358/296 |

FOREIGN PATENT DOCUMENTS 2843975 4/1979 Fed. Rep. of Germany .......... 355/7

*Primary Examiner*—Fred L. Braun
*Attorney, Agent, or Firm*—Fitzpatrick, Cella, Harper & Scinto

[57] ABSTRACT

A copying apparatus is provided with image reading device for reading image information on an original as image element signals, indicating device for indicating the area of the original to be masked in the scanning area of the original by the image reading device, mask signal formation device for reading the masked area indicated by the indicating device, by the image reading device and for forming mask signals, and recording device for controlling the image information read by the image reading devices, by the mask signals obtained by the mask signal formation device, to obtain on a recording medium a record in which the area indicated by the indicating device is masked.

4 Claims, 12 Drawing Sheets

COPYING APPARATUS

This application is a continuation, of application Ser. No. 73,488 filed Sept. 7, 1979 now abandoned.

BACKGROUND OF THE INVENTION

1. Field of the Invention

This invention relates to a copying apparatus which can produce copies of a desired form, and more particularly to a copying apparatus which can produce copies with a desired part of an original masked.

2. Description of the Prior Art

In a copying apparatus, when an original to be copied has a part which need not be copied, copying has been effected after such part of the original has been cut off or with such part of the original covered with white paper.

However, according to such a conventional system, the original to be copied must be cut off or otherwise processed and this has led to damages imparted to the original or much time involved for copying.

SUMMARY OF THE INVENTION

It is an object of the present invention to overcome the above-noted disadvantages peculiar to the prior art and to provide a copying apparatus which can mask a desired part of an original without damaging the original.

It is another object of the present invention to provide a copying apparatus which can mask a desired part of an original by a very simple construction.

It is still another object of the present invention to provide a copying apparatus in which the information on an original is converted into an image element signal and the recording by such image element signal is controlled to thereby mask a desired part of the original.

The invention will become fully apparent from the following detailed description thereof taken in conjunction with the accompanying drawings.

DESCRIPTION OF THE PREFERRED EMBODIMENTS

The invention will hereinafter be described with respect to an embodiment thereof by reference to the drawings.

Figure 1:
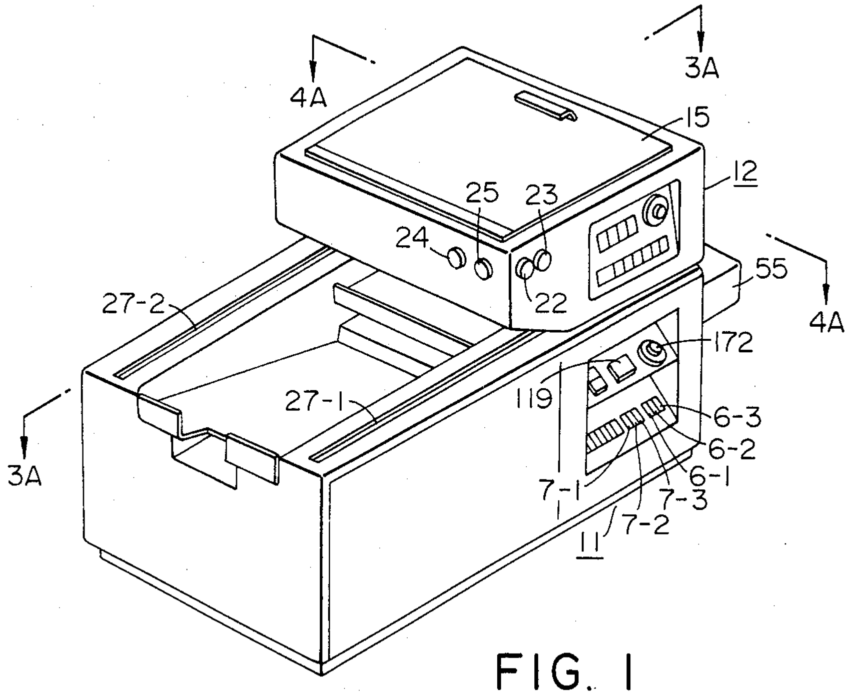
FIG. 1 is a perspective view of the copying apparatus according to an embodiment of the present invention.

Referring to FIG. 1 which is a pictorial perspective view showing a copying apparatus 11 to which the present invention is applied, the copying apparatus 11 comprises a reading device 12 for reading the information on an original to be copied and a recording device 13 for recording the information on recording paper.

Figure 2:
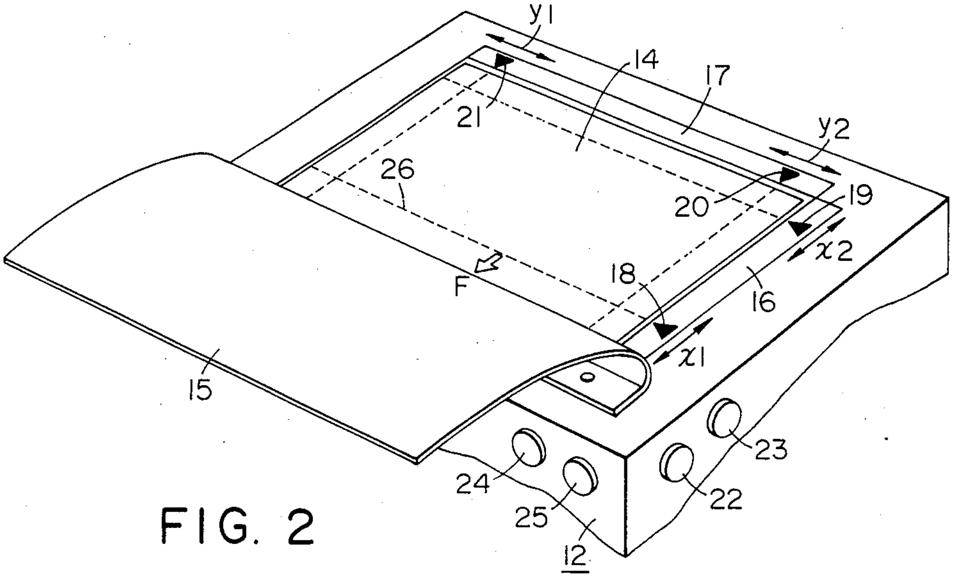
FIG. 2 is an enlarged perspective view showing the essential portions the original carriage in FIG. 1.

On top of the reading device 12, an original carriage 14 formed of glass or the like is formed as shown in FIG. 2, and an original placed on the original carriage 14 may be pressed against the original carriage 14 by a cover 15.

Two display windows 16 and 17 respectively having pointers 18, 19 and 20, 21 are provided adjacent to the original carriage 14, and as will fully be described later, the pointer 18 may be moved in the direction of arrow x1 by a thumb 22, the pointer 19 may be moved in the direction of arrow x2 by a thumb 23, the pointer 20 may be moved in the direction of arrow y2 by a thumb 25, and the pointer 21 may be moved in the direction of arrow y1 by a thumb 24.

The function of such pointers is to instruct that the information on the original which belongs to the area of the original carriage 14 outside the extensions of the pointers should not be treated as recorded information.

For example, with regard to the pointer 18, the area beyond the extension 26 of the pointer 18 and toward the arrow F is masked so that even if the original is placed on this masked area, the information on this portion is not recorded by the recording device.

Thus, where there are four pointers as shown, only the information on the area encircled by four imaginary lines indicating the extensions of the four pointers is recorded by the recording device.

The internal construction of the above-described reading device 12 will further be explained by reference to FIGS. 3 and 4. Three parallel guide rails 30-1, 30-2 and 30-3 are provided within the housing 29 of the reading device 12, and a sliding member 31-1 is slidably disposed on the guide rails 30-1 and 30-2 while a sliding member 31-2 is slidably disposed on the guide rail 30-3. A flat bed 32 is secured to the sliding members 31.

Arms 33-1 and 33-2 extend upwardly from the opposite ends of the bed 32, and a lens 34 comprising a linearly disposed light-transmitting rod-like member (focusing light-transmitting member) having a refractive index parabolically reduced from the center toward the radial direction extends between and are secured to the arms 33. Such lens is not restricted to the above-described focusing light-transmitting member, but may be a linearly disposed tiny lens for producing a one-to-one magnification erect image.

A light receptor (for example, CCD) 35 comprising a number of linearly disposed light-receiving elements may be disposed on the bed 32 so that the optical image of the original placed on the bed 14 may be focused on the light receptor 35 by said lens 34.

A rod-like lamp 36 equal in length to or longer than the lens 34 extends parallel to the lens 34 between the arms 33, and a mirror 37 is fixed so that the light emitted from the lamp 36 effectively irradiates the original carriage 14.

By moving such bed 32 on the guide rails 30, the information on the original placed on the original carriage 14 may be focused on the light receptor 35. Therefore, if clock signals are successively applied to read out the light-receiving elements successively, successive signals resulting from luster-scanning the original may be obtained from the light receptor 35.

The present embodiment is described as one in which an original of A4 size is scanned by 3000 scanning lines and one scanning line includes 2100 light-receiving elements.

To effect the forward stroke in which the bed 32 is moved at a uniform speed in the direction of arrow S on the guide rails 30 or the backward stroke indicated by arrow R, the present apparatus contains therein a motor, pulleys and wire, but such a driving system is well-known and is not shown in the drawings. In the ensuing description, such bed 32, light-receptor 35, lens 34 and lamp 36 are generally referred to as the optical head 9.

Figures 5A, 5B:
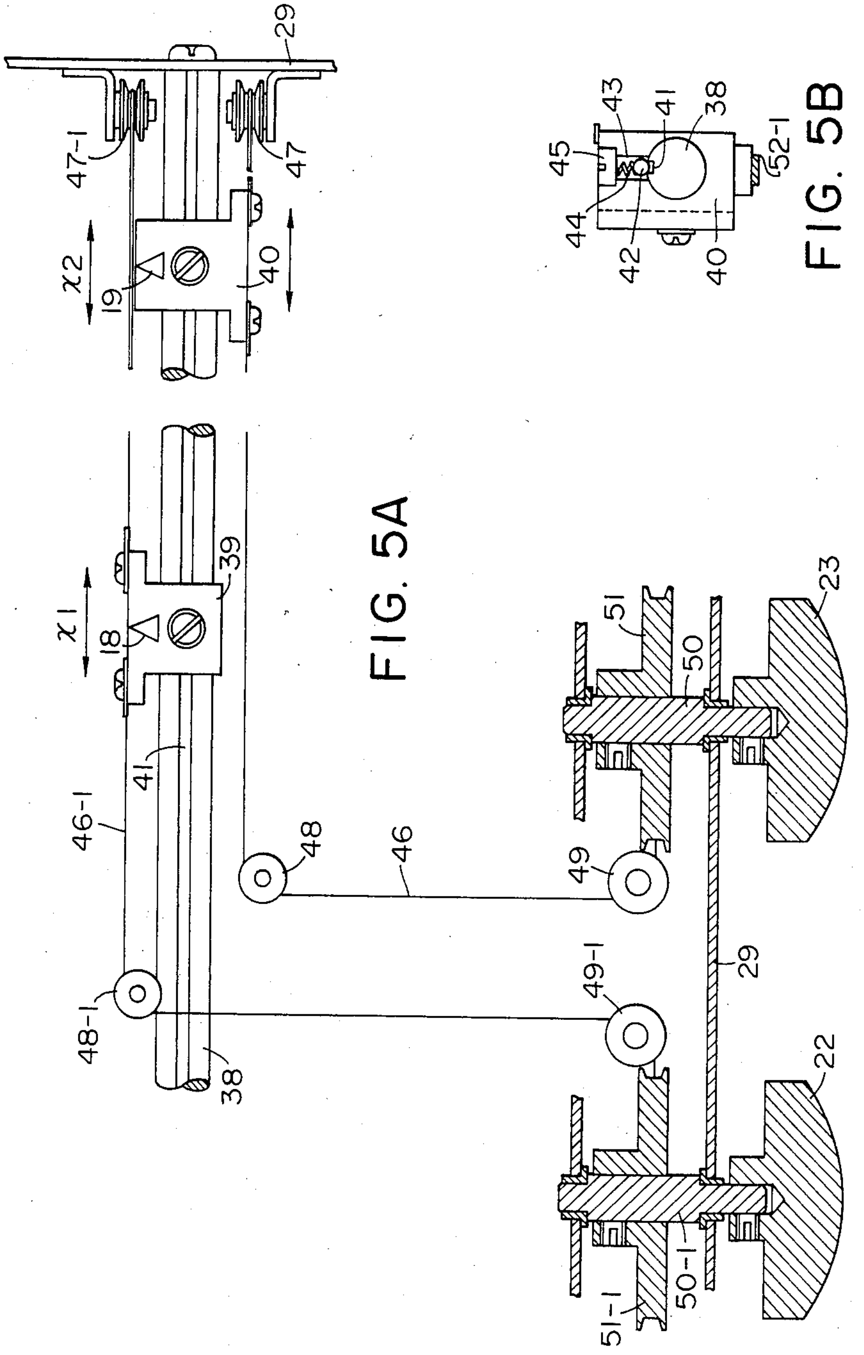
FIG. 5 shows the driving mechanism for pointers, FIG. 5A being a partly cross-sectional top plan view, FIG. 5B being a cross-sectional view showing the essential portions thereof, and FIG. 5C being a top plan view.

FIG. 5A illustrates in greater detail the mechanism for driving the pointers 18 and 19 by dials 22 and 23.

A guide rail 38 is secured to the housing 29, and beds 39 and 40 formed with pointers 18, 19 are slidably secured onto the guide rail 38.

The beds 39 and 40, as shown in FIG. 5B, have a cylindrical hole 43, a ball 42 inserted into the hole 43, a spring 44 for downwardly biasing the ball 42, and a screw 45 for preventing the spring 44 from jumping out. The ball 42 is forced into a groove 41 formed on the guide rail 38 so as to prevent the beds 39 and 40 from pivoting on the guide rail 38.

A thread 46 is secured to the bed 40 and this thread 46 is passed over pulleys 47, 48, 49, secured to the housing 29, and is wound on a pully 51 secured to the rotary shaft 50 of a thumb 23 rotatably secured to the housing 29.

Thus, by rotating the thumb 23, the bed 40 may be moved in the direction of arrow x2. The bed 39 is also driven by a similar construction and such construction is indicated by similar reference numerals with a suffix -1 added thereto.

Reflector plates 52-1, 52 are secured to the lower portions of such beds 39, 40, and a switch SW8 detects that the optical head 9 driven to scan the original has arrived at a position corresponding to the reflector plate 52, and a signal resulting from scanning and reading out the light-receptor 35 is stored in a shift register which will hereinafter be described.

Figure 5C:
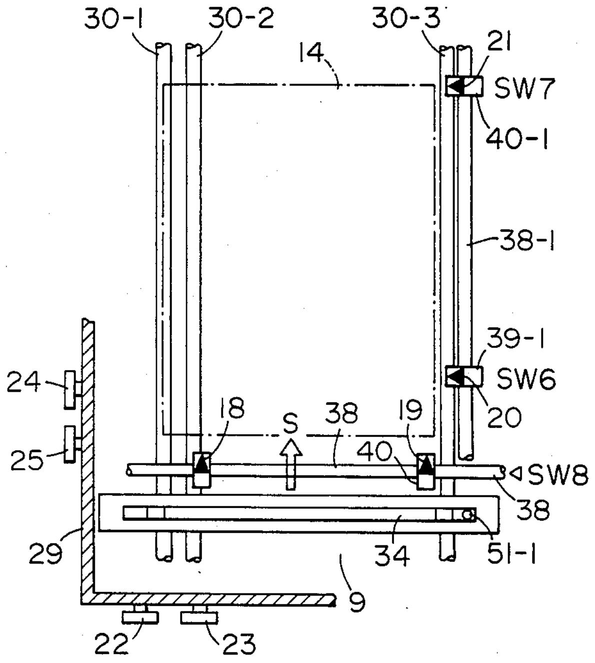

Reference is now had to FIG. 5C. Assuming that the light-receptor 35 comprises 2100 light-receiving elements, a 2100-bit shift register is prepared and the switch SW8 detects that the optical head 9 driven to scan the original has arrived at the lower portion of the beds 39, 40, and 2100 clock signals are applied to the light-receptor 35 so that the image element signals read out from the light-receptor 35 are stored in the 2100-bit shift register.

If so constructed, the positions of the reflector plates 52-1, 52 are stored in the shift register and thus, the masking in the direction x can be effected by the output of this shift register. Such masking will later be described in detail.

The pointers 20 and 21 for indicating the masking in the direction y are constructed similarly to the mechanism for indicating the masking in the direction x and therefore, corresponding members are designated by similar reference numerals with a suffix -1 added thereto.

Accordingly, the bed 39-1 may be moved on the guide rail 38-1 by means of the thumb 25 and the bed 40-1 may be moved on the guide rail 38-1 by means of the thumb 24.

However, instead of the reflector plates in the beds 39 and 40, Hall elements (hereinafter sometimes referred to as the switches SW6 and SW7) are secured to the bottom of such bed 39-1. As shown in FIGS. 3 and 5C, a magnet 51-1 is fixed to a part of the arm 33-2 of the optical head 9 at a position which is opposed to the Hall elements provided on the beds 39-1, 40-1 when the optical head 9 is moved.

When the magnet 51-1 becomes opposed to the Hall elements of the beds 39-1, 40-1 while the optical head 9 is being moved in the direction of arrow S along the guide rail 30, an output may be obtained from the Hall elements and the masking in the direction y can be effected by the use of the outputs of such switches SW6 and SW7.

Such masking will later be described in detail.

The above-described reading device is contained within a housing separate from the recording device 13 and is movable on two guide grooves 27-1 and 27-2 provided in the upper portion of the recording device 13. In the steady state of the reading device, the reading device 12 is fixed at the position as shown in FIG. 1 by being retained by a retainer 28 shown in FIG. 3.

The recording device 13 will now be described in greater detail.

An opening 54 is formed in a portion of the housing of the recording device 13, and a cassette 53 for containing therein a pile of recording paper sheets 55 cut to a predetermined size is fixedly contained in the opening 54.

A paper feed roller 56 secured to an arm 58 which is pivotable about a shaft 57 is disposed above the cassette 53 mounted in the housing. This paper feed roller 56 is normally rotating and contacts the top of the recording paper sheets 55 piled in the cassette 53 only when it feeds the paper. When paper feed is unnecessary, the paper feed roller 56 is prevented from contacting the recording paper 55 by the arm 58 being upwardly pivoted.

Such paper feed roller 56 is well-known in the field of copying apparatus or the like and therefor the detailed description thereof is omitted herein.

Designated by 59-1 and 59-2 are guide plates for guiding the recording paper fed from the cassette 55. The recording paper 55 guided by the guide plates 59 is held by and between a follower roller 60 and a drive roller 61 which together constitute a set of timing rollers 10, and is further paid away between guide plates 62-1 and 62-2 and guided to the opening 65 of an outer drum 64 provided outside a drum 63 which sucks and holds the recording paper 55.

Figure 6:
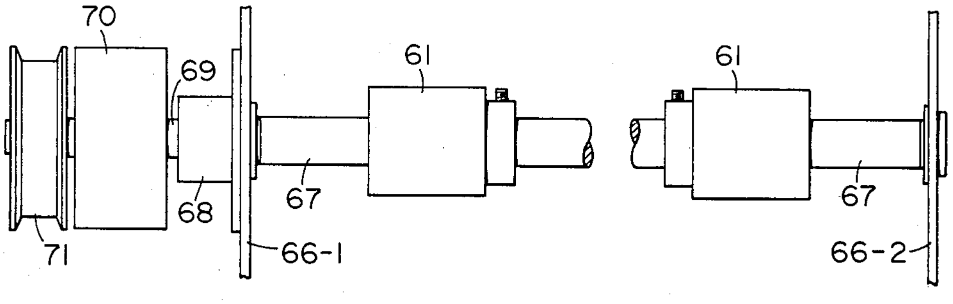
FIG. 6 is a top plan view of a driving roller.

The drive roller 61 will be described further by reference to FIG. 6. This drive roller 61 is fixed to a shaft 67 rotatably provided between frames 66-1 and 66-2 fixed to the housing, the shaft 67 being fixed to a shaft 69 through a one-way clutch 68, and the shaft 69 in turn is connected to a shaft on which a pulley 71 is secured through a clutch 70.

Figure 3:
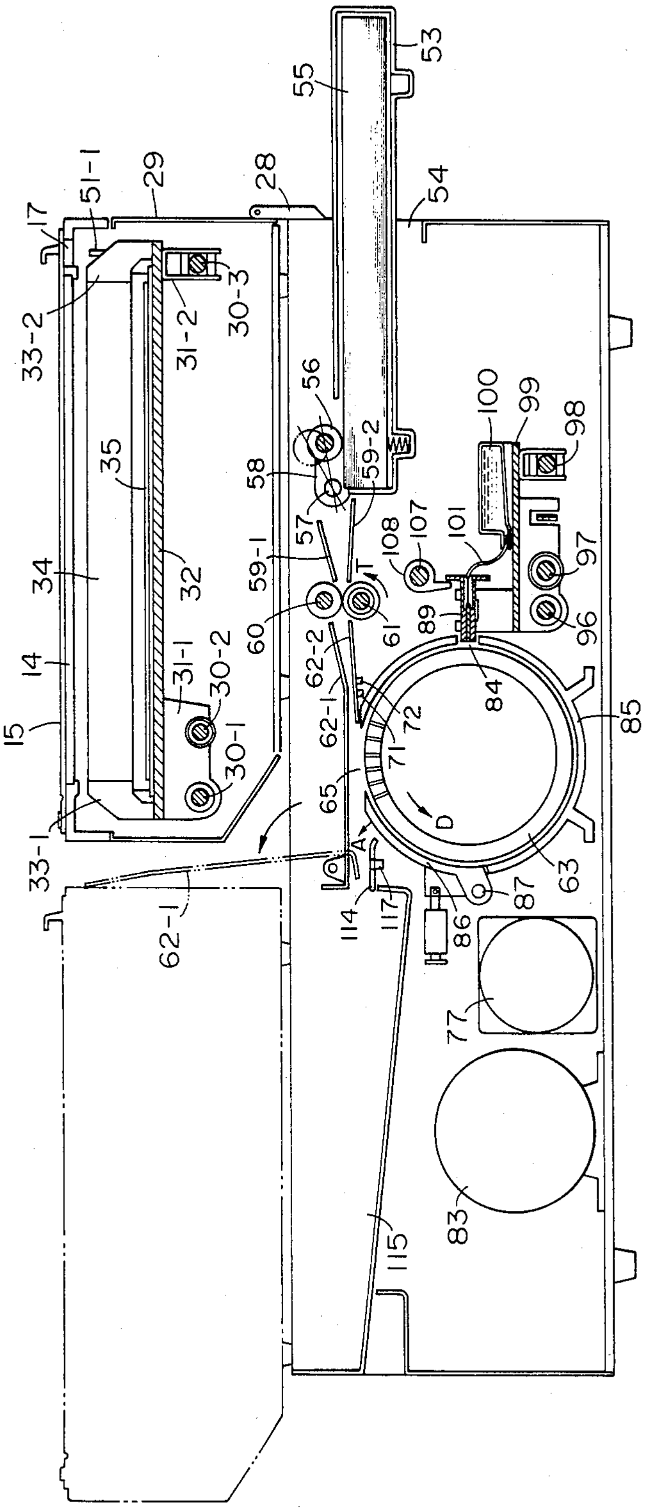
FIG. 3 is a cross-sectional view taken along line 3A—3A of FIG. 1

The pulley 71 is normally driven by a motor, not shown, so that the drive roller 61 is rotated in the direction of arrow T indicated in FIG. 3 and therefore, by engaging the clutch 70, the drive roller 61 is driven at a predetermined peripheral velocity V through the one-way clutch 68.

The velocity of the drum 63 is greater with respect to the paper feeding speed of the drive roller 61 and therefore, when the leading end of the recording paper fed by the drive roller 61 is wrapped around the drum 63 while the trailing end of the recording paper is still held by and between the drive roller 61 and the follower roller 60, an abnormal tension is exerted on the recording paper 55 to break the paper. Therefore, in the present embodiment, as shown in FIG. 6, the one-way clutch 68 is provided so that, when the recording paper 55 held by and between the drive roller 61 and the follower roller 60 is pulled by the drum 63, the one-way clutch 68 is operated to enable the drive roller 61 to be rotated at a velocity greater than the driving speed of the pulley 71.

If so constructed, the drum 63 which greatly affects the recording speed can be rotated at a high velocity to enhance the recording speed.

A light-emitter 71 and a light-receptor 72, which are secured to the guide plate 62-2, together constitute a paper detector. The light emitted by the light-emitter 71 is reflected by the passage of the recording paper and the reflected light is received by the light-receptor 72 to thereby detect the passage of the recording paper. Such paper detector will hereinafter sometimes be referred to as the switch SW1.

Figure 4:
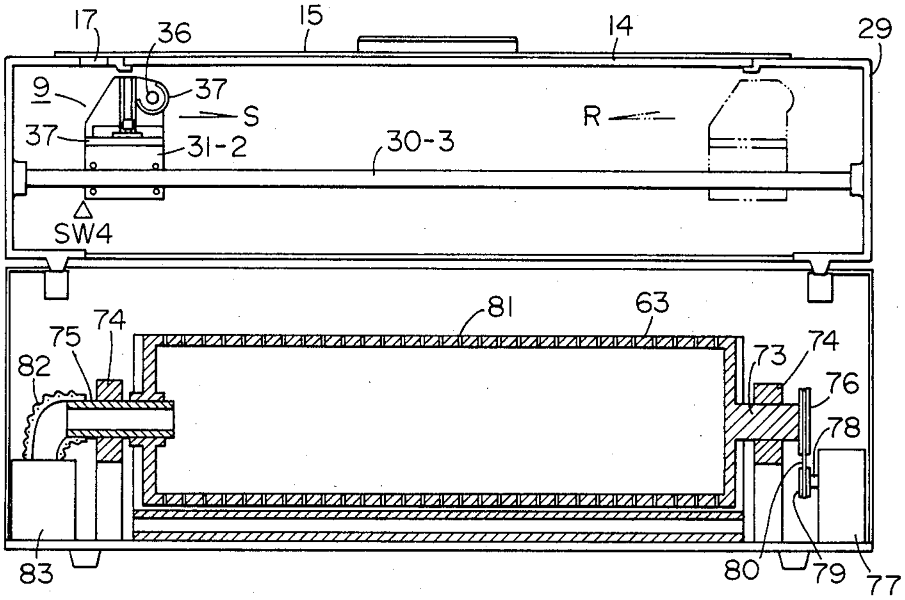
FIG. 4 is a cross-sectional view taken along line 4A—4A of FIG. 1.

The drum 63 is in the form of a hollow cylinder and as shown in FIG. 4, one end thereof is rotatably held on a shaft 73 secured to the drum 63, by means of a bearing 74, while the other end is held for rotation with respect to a shaft cylinder 75 secured to a holding frame 74 and with an air-tight condition being maintained between the shaft cylinder 75 and the drum 63.

A pulley 76 is secured to the end of the shaft 73, and the pulley 76 is driven by a belt 80 passed over the pulley 76 and a pulley 79 secured to the rotary shaft 78 of a motor 77 to thereby rotatively drive the drum 63 in the direction of arrow D.

A number of through-apertures 81 are formed in the circumferential portion of such drum 63 to render the interior of the drum 63 to a negative pressure with respect to the atmospheric pressure, whereby the recording paper 55 may be adsorbed to the circumferential portion of the drum 63.

For this purpose, a hose 82 is connected to the shaft cylinder 115 and the end of this hose 82 is connected to a suction pump 83.

Accordingly, when the leading end of the recording paper is conveyed to the opening 65 by the timing rollers with the pump 83 and motor 77 being driven, the leading end of the recording paper is sucked by the drum 63 and tends to rotate with the drum 63. When the area of the leading end which is wrapped around the drum 63 is small, the recording paper 55 is fed in accordance with the rotational velocity of the timing rollers and in the meantime, the recording paper 55 is slipping around the drum 63 by an amount corresponding to the difference between the peripheral velocity of the drum 63 and the feeding speed of the timing rollers, but once the recording paper is wrapped around the drum 63 to a certain extent, the recording paper is taken up by the drum 63 at the same speed as the rotational velocity of the drum 63 and at this time, the one-way clutch 68 is operated to cause idle rotation of the drive roller 61.

A cylindrical outer drum 64 having a diameter somewhat larger than that of the drum 63 is disposed outside the drum 63. The opposite ends of this outer drum 64 are open, and an opening 65 for taking in and discharging the recording paper 55 is provided at the upper end of the outer drum, and a slit 84 through which an ink jet nozzle, to be described, may be moved is provided in the side of the outer drum.

The outer drum 64 comprises a fixed drum portion 85 and a loose drum 86 supported by a shaft 87, and is constructed such that when the recording paper 55 jams in the clearance between the drum 63 and the outer drum 64, the loose drum 86 may be rotated about the shaft 87 in the direction of arrow A to thereby permit removal of the recording paper 55.

Figure 7:
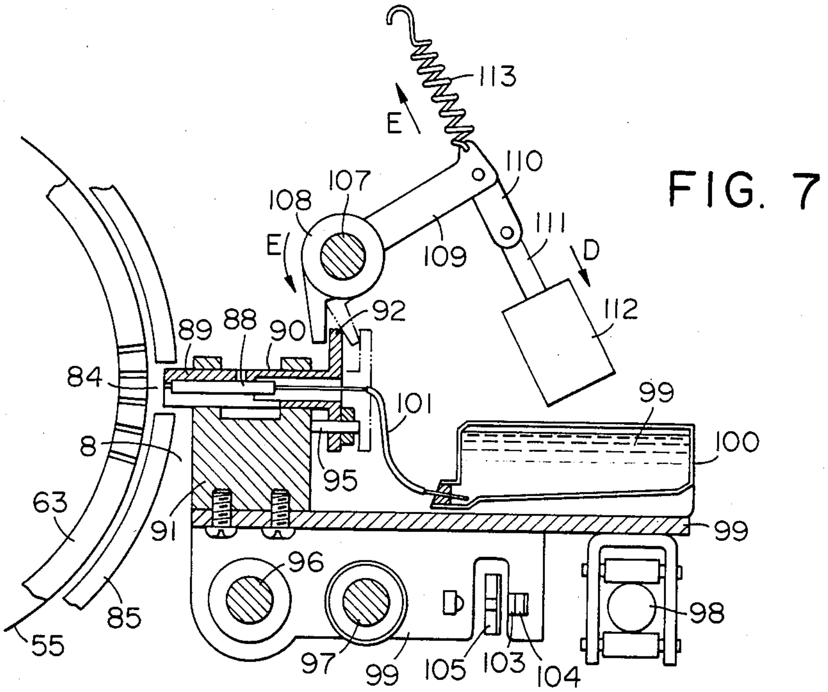
FIG. 7 is a side view of a recording head.

As mentioned previously, an ink jet nozzle 88 is movable through the slit 84 and this ink jet nozzle constitutes a nozzle head 90 with the surrounding thereof covered by a protective cylinder 89, as shown in FIG. 7. This nozzle head 90 is fixed on a bed 91 for sliding movement in a direction perpendicular to the rotary shaft of the drum 63.

Figure 8:
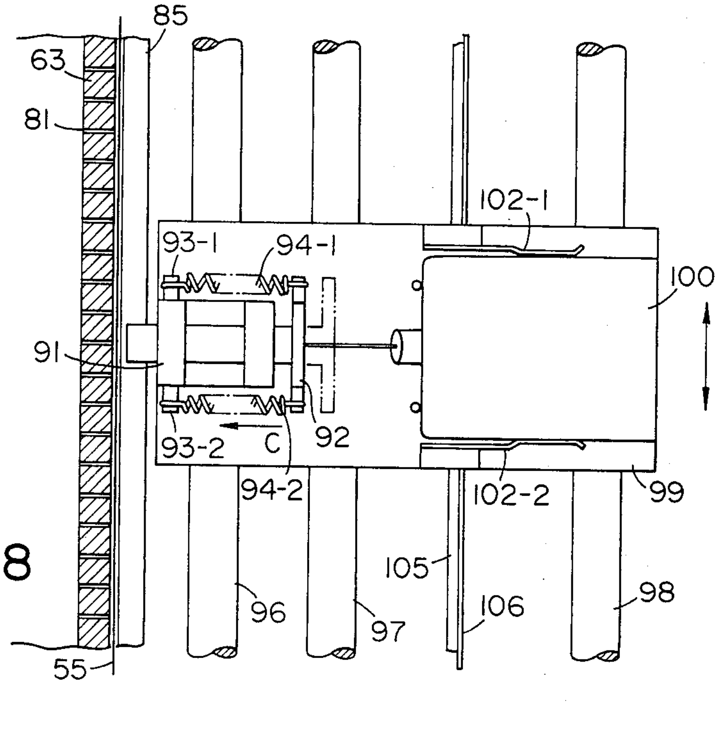
FIG. 8 is a top plan view of the recording head.

That is, as shown in FIGS. 7 and 8, the rear end of the head 90 is provided with a flange 92 and a portion of the bed 91 is provided with projections 93-1 and 93-2, and springs 94-1 and 94-2 are mounted between the flange 92 and the projections 93. Accordingly, the nozzle head 90 is normally biased in the direction of arrow C. The flange 92 is provided with a stop screw 95 which may be adjusted so as to keep the end of the nozzle head spaced apart by a minute distance from the recording paper 55 wrapped around the drum 63. Such distance is an optimal distance for effecting the recording on the recording paper 55 by the ink jet nozzle 88.

On the other hand, the bed 91 is fixed to a movable bed 99 slidably secured on three guide rails 96, 97 and 98 extending parallel to the axis of rotation of the drum 63 and therefore, by the movement of the movable bed 99 along the guide rails 96–98, the head 90 can move through the slit 84 from one end to the other end of the drum 63. A tank 100 filled with ink 99 is placed on such movable bed 99 and the ink is supplied from the tank 100 to the ink jet nozzle 88 through a pipe 101.

The fixing of such tank 100 to the movable bed 99 may be accomplished by the tank 100 being held by and between the free ends of plate springs 102-1 and 102-2 each having one end thereof secured to either side of the movable bed 99.

Since the movement of such movable bed 99 is accomplished by a linear motor, a permanent magnet 103 and yoke 104 constituting the linear motor are fixed to a portion of the movable bed 99 and a coil 105 is provided outside such movable bed 99 in opposed relationship with the permanent magnet 103. This coil 105, as shown in FIG. 8, is linearly provided on a holding plate 106 extending parallel to the guide rail 98.

Also, as shown in FIG. 7, a shaft 107 parallel to the axis of rotation of the drum 63 is provided above the movable bed 99 and extends substantially over the entire width of the drum 63, and a cam 108 for driving the flange 92 is provided on the shaft 107 and extends substantially over the entire width of the drum 63.

An arm 109 is secured to the end of the cam 108 and is connected to a plunger 111 driven by a solenoid 112, through a connecting arm 110, and the end of the arm 109 is biased in the direction of arrow E by a spring 113. The spring force of this spring 113 is stronger than that of the springs 94-1, 94-2 and therefore, when the solenoid 112 is not driven, the cam 108 is rotated in the direction of arrow E to assume its dot-and-dash line position and force back the flange 92 of the nozzle head 90 to its dot-and-dash line position.

In other words, when the solenoid 112 is not driven, the fore end of the nozzle head 90 (the ink jet nozzle 88) is moved to the outside of the slit 84. Accordingly, the mounting or dismounting of the outer drum 64 and of the movable bed 99 and bed 91 may be easily accomplished.

If the solenoid 112 is energized to drive the plunger 111 in the direction of arrow D against the force of the spring 113, the cam 108 will be rotated to its position indicated by solid lines.

In such a state, the nozzle head 89 is pulled toward the drum 63 by the force of the spring 94 until the stop screw 95 bears against the bed 91, and the fore ends of the nozzle head 89 and the ink jet nozzle 88 come into the slit 84.

If design is made such that the position of the ink jet nozzle 89 can be so controlled by the control of the solenoid 112, when the recording paper 55 jams, for example, in the clearance between the drum 63 and the outer drum 64, the solenoid 112 may be driven by the jam detection output to retract the ink jet nozzle 88 and the ink jet nozzle 88 may be retracted during the maintenance check-up or the like as well and thus, the ink jet nozzle 88 may be prevented from being damaged. In the ensuing description, the beds 91 and 99 and the nozzle head 88 will be referred to as the recording head 8.

On the recording paper 55 wrapped about the drum 63 which is rotated at a high velocity, the recording is effected by the ink jet nozzle 88 which is moved at a predetermined low speed along the guide rails 96-98, and by successively applying the signals of the original obtained by the light-receptor 35 to the ink jet nozzle 88, the information identical to the original may be recorded on the recording paper 55.

When the recording onto the recording paper 55 has been so terminated, the pump 83 is stopped to release the negative pressure condition within the drum 63 to render the pressure therewithin to the same level as the atmospheric pressure or to a negative pressure more approximate to the atmospheric pressure, whereby the recording paper adsorbed to the drum 63 is separated therefrom and at a point of time whereat the leading end of the recording paper has reached the opening 65, the recording paper 55 is guided by guide plates 62-1 and 114 and jumps out into a discharged paper containing portion 115 so as to be contained therein. If desired, the pump 83 need not be stopped but instead, a lid for introducing the ambient air into the hose 82 may be provided in a portion of the hose 82 and by controlling the opening-closing of such lid by the plunger, the negative pressure condition within the drum 63 may be controlled.

A detector (hereinafter referred to as the switch SW2) for detecting that the leading end of the recording paper 55 has passed the portion opposed to the ink jet nozzle 88 is provided on a portion of the outer drum 85, and a detector 117 (hereinafter referred to as the switch SW3) for detecting the passage of the trailing end of the recording paper is also provided on a portion of the guide plate 114. Operation of such detectors will hereinafter be described in detail with respect to the control.

As already described, two guide grooves 27 are provided in the upper portion of the recording device 13 and the reading device 12 are movable along these grooves 27. Check-up of the environment of the drum 63 within the recording device 13 may be accomplished by moving the reading device 12 to the containing portion 115 as indicated by dot-and-dash line in FIG. 3.

To facilitate such check-up, one end of the guide plate 62-1 is pivotally supported by a shaft 118 and when the reading device has been moved, the guide plate 62-1 may be pivoted about the shaft 118 as indicated by dot-and-dash line to thereby directly expose the drum 63 and in such a state, the drum 63 and its environment may be checked up.

Figures 9, 9A:
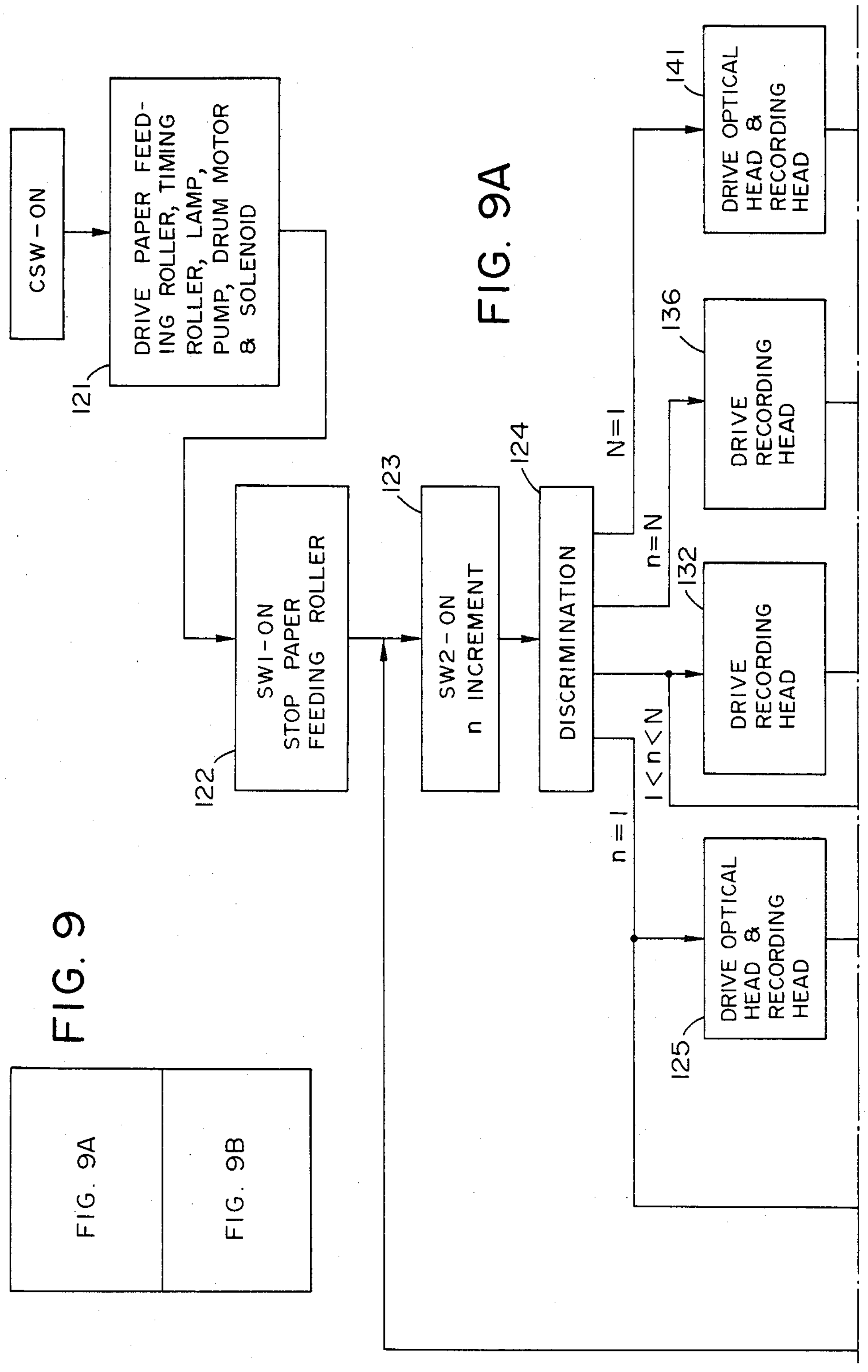
FIG. 9 shows the relative position of FIGS. 9A and 9B.
FIGS. 9A and 9B illustrate the control procedures.
Figure 9B:
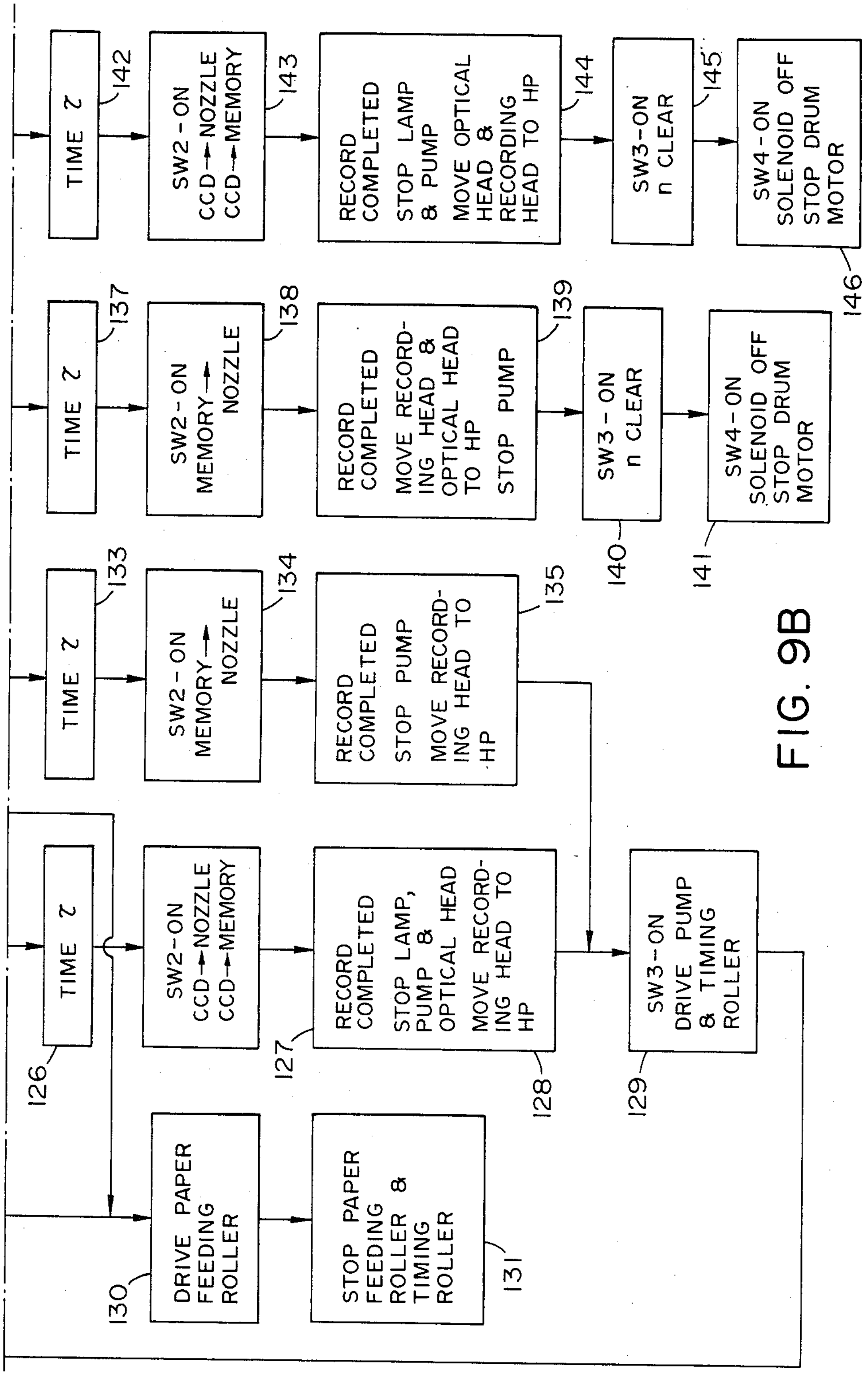

The operation of the above-described copying apparatus takes place in the sequence as shown in FIG. 9 and therefore, the outline of the operation will first be described by reference to FIG. 9.

Figure 10:
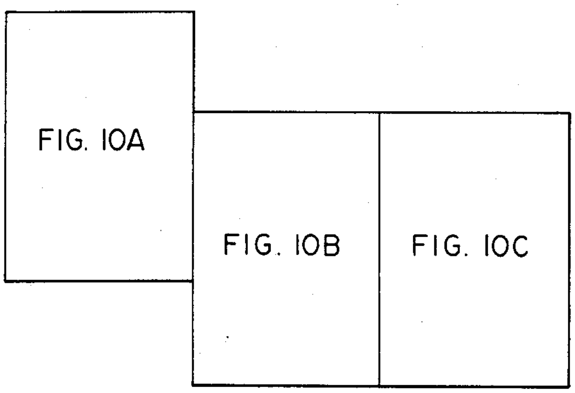
FIG. 10 shows the relative positions of FIGS. 10A, B and C.
Figure 10A:
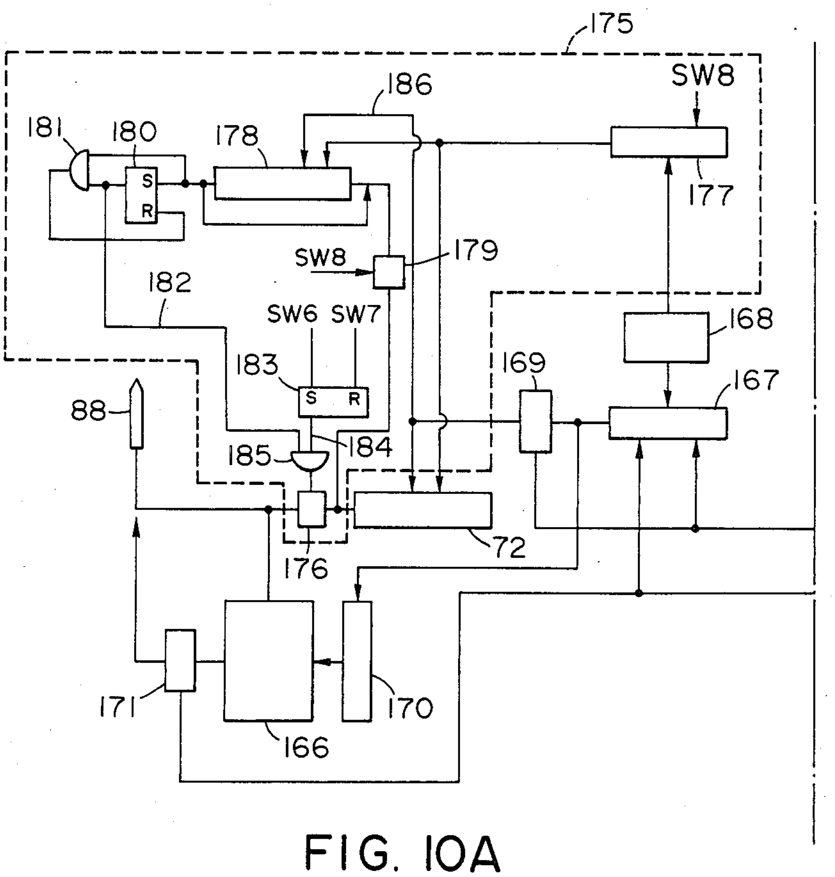
FIGS. 10A, B and C are a diagram of a control circuit.
Figure 10B:
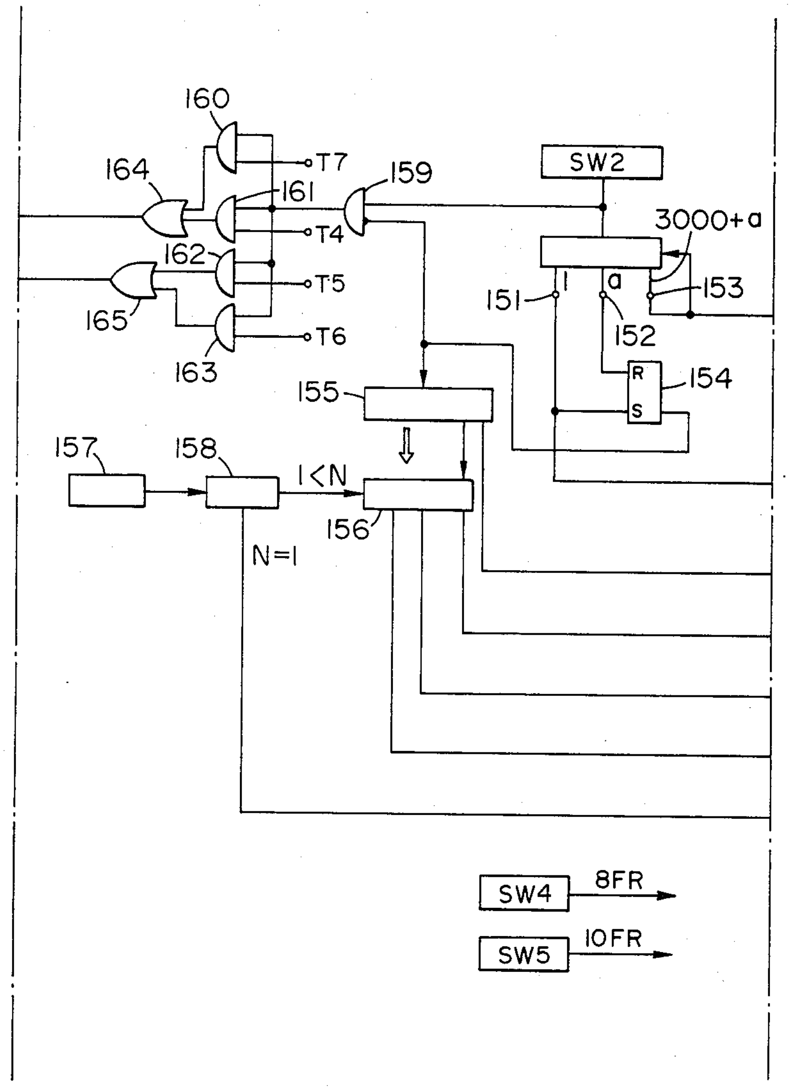
Figure 10C:
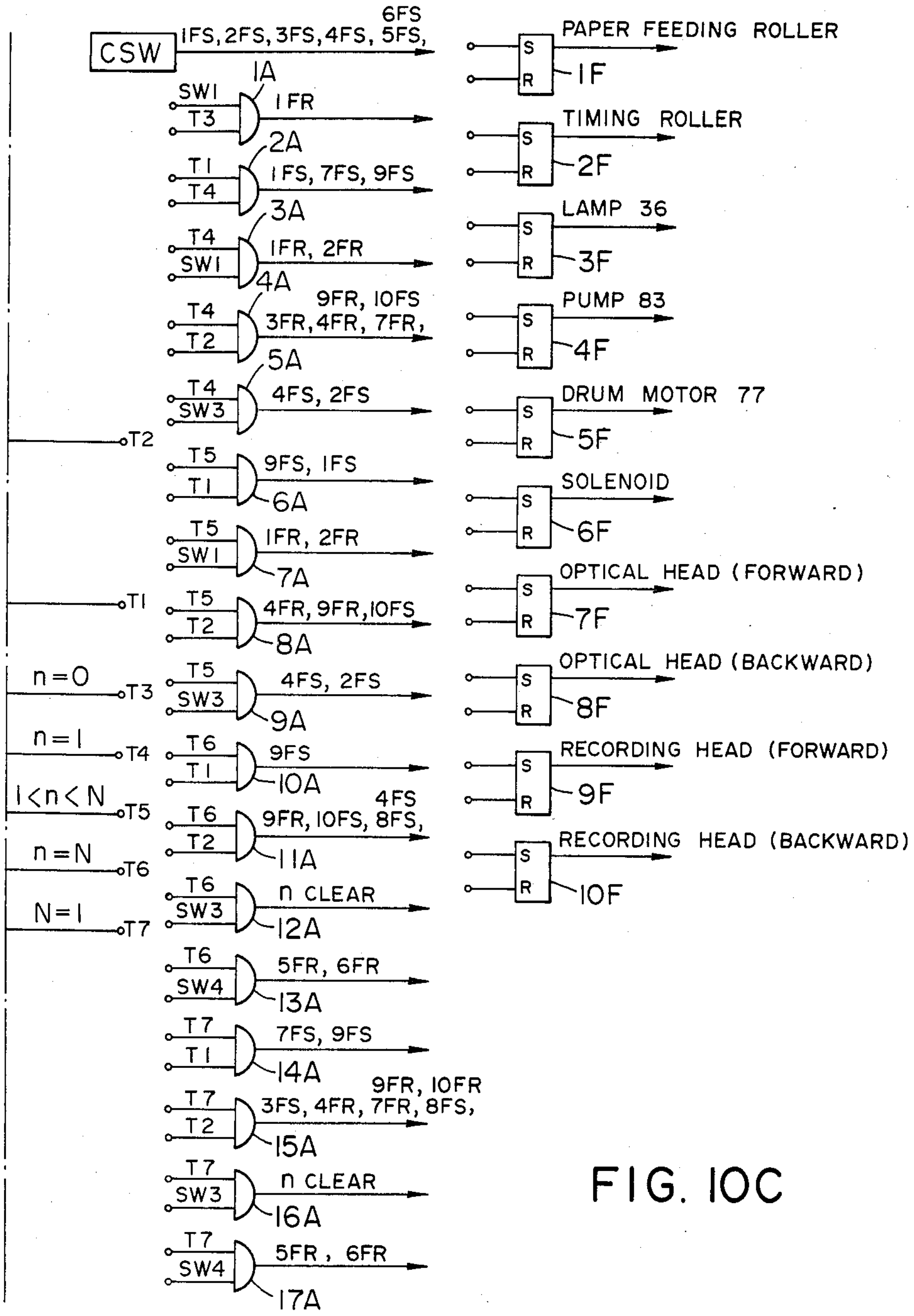
Figure 11:
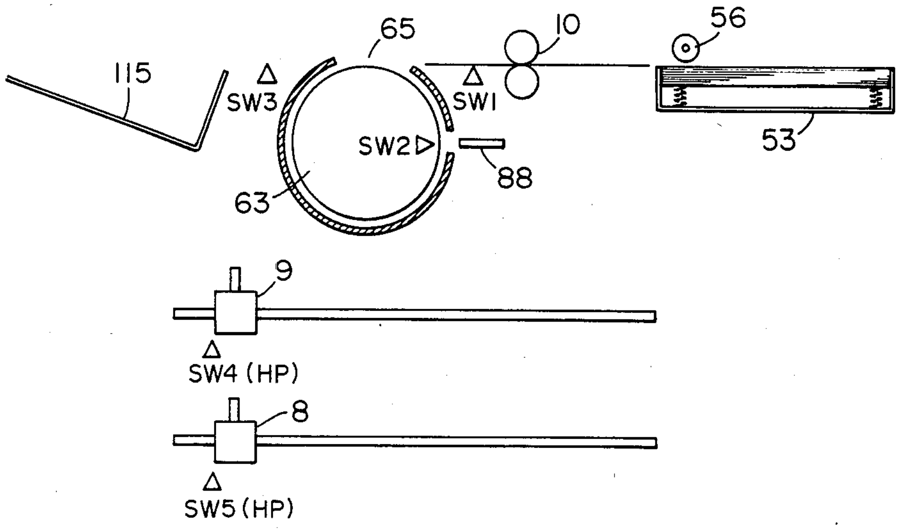
FIG. 11 is a schematic view of a copying apparatus.

FIG. 11 is an illustration schematically showing only the portions concerned with the control to make the description of FIGS. 9 and 10 understood.

When a copy switch 119 (CSW) is depressed, the paper feed roller 56, the timing rollers 10, the original illuminating lamp 36, the pump 83 for rendering the interior of the drum to a negative pressure, the drum motor 77 for driving the drum, and the solenoid 112 for advancing the nozzle head 90 are driven as indicated by a block 121. Thus, the recording paper 55 is fed from the cassette 53 and, when the leading end of the recording paper 55 is detected by the switch SW1, as indicated by a block 122, the drive of the paper feed roller 56 is stopped. The recording paper 55 is transported by the timing rollers 10 and, when the leading end of the recording paper 55 arrives at the opening 65 of the outer drum 64, the recording paper is adsorbed to the circumference of the drum 63 the interior of which is maintained at a negative pressure, and is rolled up into between the drum 63 and the outer drum 64 with the rotation of the drum 63.

When the leading end of the recording paper so wrapped around the drum 63 is detected by the switch SW2, the count content n of a counter for counting the number of copies is increased by an increment, as indicated by a block 123.

Whether or not the set number N of copies is 1 and if $1<N$, what number of copies is now being produced is discriminated in a block 124, and different copy processes are effected depending on the result of this discrimination.

That is, when it is instructed that a plurality of copies should be taken from a single original, whether $n=1$, i.e. whether the copy now being produced is the first one of a plurality of copies, or whether $n=N$, i.e. whether the copy now being produced is the last one of a plurality of copies, or whether $1<n<N$, i.e. whether the present case is in the other state than the above-mentioned states, or whether it is instructed that one copy should be taken from a single original is discriminated and different processes are executed depending on the result of this discrimination.

More specifically, when $n=1$, the processes of blocks 125–131 of FIG. 9 are carried out and first, movement of the optical head 9 and the recording head 8 is started. When time $\tau$ has elapsed after the starting of the movement (this time $\tau$ is determined by detecting that the switch SW2 is closed a times), the velocities of movement of the optical head 9 and the recording head 8 become predetermined constant velocities (in short, the time $\tau$ is the preparatory running period of the recording head 9) and therefore, each time the switch SW2 is closed after the lapse of the time $\tau$, the ON signal is read out and image element signals are successively read out as synchronizing signals from the light-receptor 35, and these image element signals so read out are applied to the recording head 8 and also stored in a memory.

When the switch SW2 has been closed 3000 times and the read-out from the light-receptor 35 has been effected 3000 times after the lapse of the time $\tau$, the lamp 36 and the pump 83 are deenergized and the movement of the optical head 9 is stopped and the recording head 8 is moved backwardly to return to its home position, as indicated in a block 128.

In such a state, when the switch SW3 detects the trailing end of the recording paper 55 discharged from the drum 63, the pump 83 and the timing rollers 10 are driven as indicated in a block 129, thus again entering into the control of block 123.

On the other hand, as indicated in a block 130, the driving of the paper feed roller 56 and the timing rollers 10 is started with the start of the driving of the optical head 9 and the recording head 8, and the switch SW1 is closed to thereby stop the paper feed roller 56 and the timing rollers 10. That is, when a plurality of copies are to be produced, the next recording paper sheet is fed to a location as near as possible to the recording station to thereby shorten the time required for the next recording.

Also, as indicated in the block 128, at the point of time whereat the recording of the first sheet has been terminated, the optical head 9 is not returned to its home position but only the recording head is returned to its home position and this is because the scanning by the optical head is not always necessary for the recording of the second sheet and so on and the return of the optical head 9 to its home position (HP) is effected after the recording of all sheets (N sheets) has been completed.

If the optical head 9 is so returned to its home position (HP) after the recording of all sheets has been completed, the recording can be accomplished without the vibration or the like of the optical head 9 during its backward stroke taken into account.

When the processes of the blocks 123 and 124 are again entered in the manner as already described after the recording of the first sheet has been terminated, $1<n<N$ is discriminated in the block 124 and therefore, as indicated in a block 132, the forward stroke of the recording head 8 is started and, each time the switch SW2 is closed after the lapse of the time $\tau$, the image element information corresponding to one scanning line is read out from the memory and applied to the recording head 8.

That is, the image element information read out during the recording of the first sheet is stored in the memory and therefore, during the recording of the second sheet and so on, the actual original is not scanned but the recording is effected by the image element signals read out from this memory.

When it is detected in a block 135 that the recording of one page has been effected in a block 134, the pump 83 is stopped and the recording head 8 is returned to its home position HP, whereafter the control of the block 129 takes place. Also, simultaneously with such recording, the feeding of the recording paper 55 as indicated in the blocks 130 and 131 takes place.

The recording of the same information is repeated in the described manner and when the recording of $n=N$ has been discriminated in the block 124, the forward stroke of the recording head 8 is started as indicated in a block 136 and after the lapse of the time $\tau$, the content of the memory is recorded on the recording paper 55 in the same manner as that described with respect to the block 134 and, when the completion of the recording of one page has been detected in a block 139, the recording head 8 and the optical head 9 are returned to their home positions and the driving of the pump 83 is stopped. The switch SW3 detects the trailing end of the recording paper 55, whereby the count content n of the counter which counts the number of recorded sheets is cleared and in the next step 141, a switch SW4 for detecting the return of the optical head 9 to its home position is closed to thereby stop the driving of the drum motor and solenoid 112. During the backward stroke, the velocity of the optical head is slower than that of the recording head and therefore by the point of time whereat the optical head arirves at its home position, the recording head 8 has already arrived at its home position.

In this manner, for the recording of the $n=N$th sheet, the pre-feeding of the recording paper 55 is not effected and at the termination of the recording, not only the optical head 9 but also the recording head 8 is returned to the home position.

Description has been made with respect to the case where the set number N of recorded sheets is greater than 1, but when $N=1$, the processes as indicated in the blocks 141–146 of FIG. 9 are carried out.

That is, when $N=1$ is discriminated in the block 124, the process of the block 141 is executed to start the forward stroke of the optical head 9 and the recording head 8 and each time the switch SW2 is closed after the lapse of the time $\tau$, the output of the light-receptor is applied to the nozzle and the memory, as described with respect to the block 127. When the completion of the recording onto the recording paper is detected, the lamp 36 and the pump 83 are deenergized and the optical head 9 and the recording head 8 are moved backwardly to return to their home positions.

The recording operation is terminated through the steps 145 and 146 which are similar to the steps 140 and 141.

By designing the copying apparatus so that the operation thereof differs from the time when $N=1$ to the time when $1<N$, that when $1<N$, the operation thereof differs from the time when $n=1$ to the time when $1<n$ and that when $1<n$, the content of the memory is recorded, the copying speed can be improved and copies of high quality free of any deviation of the original can be obtained.

The outline of the control of the copying apparatus according to the present embodiment has been described above, and the control circuit will hereinafter be described specifically be reference to FIGS. 10 and 11.

Designated by 1F–10F in FIG. 10 are S-R flip-flops. The flip-flops 1F drives the paper feed roller 56 by its set output (the word "drive" herein used means lowering the paper feed roller 56 to feed the paper from the cassette 53), the flip-flop 2F drives the timing rollers 10 by its set output, the flip-flop 3F turns on the lamp 36 by its set output, the flip-flop 4F drives the pump 83 by its set output, the flip-flop 5F drives the motor 77 by its set output, the flip-flop 6F drives, by its set output, the solenoid 112 which moves the nozzle head 90 toward the drum 63, the flip-flop 7F forwardly moves the optical head 9 by its set output (the forward movement is the movement away from the home position HP), the flip-flop 8F backwardly moves the optical head 9 (the backward movement is the movement back to the home position HP), the flip-flop 9F forwardly moves the recording head 8 by its set output, and the flip-flop 10F backwardly moves the recording head 8 by its set output.

The flip-flops 8F and 10F are reset by the outputs of switches SW4 and SW5 which results from the optical head 9 and the recording head 8 arriving at their home positions (HP) to drive the switches SW4 and SW5.

Designated by 1A–17A are AND gates for controlling the flip-flops 1F–10F by their outputs. These AND gates indicate the objects to be controlled by giving the symbols of the flip-flops to be controlled and symbols designating the signals to be applied to the S terminals (set terminals) of the flip-flops or the signals to be applied to the R terminals (reset terminals) of the flip-flops. For example, 1FS indicates the application of the signal to the set terminal S of the flip-flop 1F, and 1FR indicates the application of the signal to the reset terminal R of the flip-flop 1F.

The output of the switch SW2 is applied to a counter 150 for counting the number of times of the output of the switch SW2, and this counter 150 has count output terminals 151–153 for 1, a and 3000+a. The terminal 151 is connected to a terminal T1 and to the set terminal S of a flip-flop 154, and the terminal 152 is connected to the reset terminal R of the flip-flop 154. The terminal 153 is connected to a terminal T2 and applies its output to the counter 150 to clear this counter 150.

The set output of the flip-flop 154 is applied to a counter 155 and, when the count content n of this counter 155 is "0", the output thereof is derived at a terminal T3 and when $1 \leq n$, the count output thereof is applied to a discriminator 156. When $n=1$, the output is derived from the discriminator 156 to a terminal T4.

Designated by 157 is a number-of-sheets setting device for recording the number (N) of copies. A discriminator 158 discriminates whether the set number N is $N=1$ or $N>1$. When $N=1$, the output is derived at a terminal T7 and when $N>1$, the recorded content of the setting device 157 is applied to the discriminator 156 to render the discriminator 156 to its driven state and n is discriminated and n and N are compared in this discriminator 156, and when $n=1$, the output thereof is derived at a terminal T4. When the result of the comparison is $1<n<N$, the output is derived at a terminal T5 and when $n=N$, the output is derived at a terminal T6.

The output of the switch SW2 is applied to an AND gate 159 and the output of the flip-flop 154 is applied to the AND gate 159. Accordingly, from this AND gate 159, switch ON signal is derived 3000 times each time the switch SW2 is closed after the switch SW2 has been closed a times.

The output of such AND gate 159 is applied to AND gates 160–163. The output of a terminal T7 is applied to one end of the AND gate 160, the output of a terminal T4 is applied to one end of the AND gate 161, the output of a terminal T5 is applied to one end of the AND gate 162, and the output of a terminal T6 is applied to one end of the AND gate 163. The outputs of the AND gates 160 and 161 are applied to an OR gate 164, and the outputs of the AND gates 162 and 163 are applied to an OR gate 165. Accordingly, the image element signals from the light-receptor 72 such as CCD are read out from the OR gate 164 and when the image element signals are applied to a memory 166 and the ink jet nozzle 88, a read-out synchronizing signal is derived, and the image element signals from the memory 166 are read out from the OR gate 165 and when such image element signals are applied to the ink jet nozzle 88, a read-out synchronizing signal is derived.

As already described, when recording is effected on recording paper of A4 size in the copying apparatus according to the present embodiment, 3000 scanning lines each comprising 2100 image elements are used and therefore, by the derivation of one read-out synchronizing signal, 2100 clock signals are applied to the light-receptor 72 or the memory 166. Designated by 167 is a clock deriving circuit for deriving a predetermined number of clocks. If the clocks generated by a clock generator 168 are applied, the clock deriving circuit 167 counts and puts out 2100 clock signals each time the read-out synchronizing signal is applied. The output of the OR gate 164 is also applied to a gate circuit 169 and when there is a read-out synchronizing signal output from the 0R gate 164, 2100 clock signals are applied to both the light-receptor 72 and the address circuit 170 of the memory 166. This gate circuit 169 opens its gate for one scanning period by the application of the synchronizing signal.

Accordingly, the image element signals successively read out from the light-receptor 72 are applied to the ink jet nozzle 88 and these image element signals are also applied to the memory 166, in which they are successively stored at the address designated by an address circuit 170.

When the read-out synchronizing signal is derived from the OR gate 165, 2100 clock signals are derived from the clock deriving circuit 167, but the gate circuit 169 is not opened and thus, the clock signals are applied only to the address circuit 170 and the read-out synchronizing signal is applied to a gate circuit 171 provided in the output circuit of the memory 166, whereby the gate circuit 171 is opened so that the image element signals read out by the address designation of the address circuit 170 are applied to the ink jet nozzle 88 through the gate circuit 171. This gate circuit 171 opens its gate for one scanning period by the application of the synchronizing signal.

The operation of the control circuit having the above-described construction will be described in greater detail. First, the operation when the desired number of copies is set to "3" (N=3) will be described by reference to FIGS. 9 and 10.

When the copy switch CSW is closed after three copies is designated by operating a copy number setting dial 172 (the setting device 157 is set to "3" ), signals 1FS, 2FS, 3FS, 4FS, 5FS and 6FS are put out as shown in FIG. 10, and the flip-flops 1F–6F are set and the paper feed roller 56, the timing rollers 10, the lamp 36, the pump 83, the drum motor 77 and the solenoid 112 are driven.

By this, a sheet of recording paper 55 is fed from the cassette 53 and this recording paper 55 is further transported toward the drum 63 by the timing rollers 10. At this time, the leading end of the recording paper 55 is detected by the switch SW1 and as shown at the AND gate 1A, the switch SW1 is closed when the recording onto the recording paper 55 is not at all taking place (n=0), whereby the signal 1FR is derived so that the driving of the paper feed roller 56 is stopped. Since, however, the timing rollers 10 are continuedly rotating, the recording paper 55 is further conveyed to reach the opening 65 of the outer drum 64. Since the interior of the drum 63 is rendered to a negative pressure by the operation of the pump 83, the leading end of the recording paper 55 is adsorbed to the surface of the drum 63 and pulled into the clearance between the outer drum 64 and the drum 63. As already described, a one-way clutch is inserted between the timing rollers 10 and therefore, the recording paper 55 can pass between the timing rollers 10 without any inconvenience even if the peripheral velocity of the drum 63 is faster than the paper feeding speed of the timing rollers 10.

When the leading end of the recording paper 55 wrapped around the drum 63 is detected by the switch SW2 in this manner, the counter 150 counts 1 and renders the terminals 151 and T1 to a high level, so that the flip-flop 154 is set and the count content of the counter 155 becomes "1".

Since N=3 as already noted, the discriminator 158 applies this 3 to the discriminator 156 and also renders the discriminator 156 into its driven state, and the counted number "1" of the counter 155 is applied to this discriminator 156, whereby a high level signal is derived at the terminal T4. (Since N≠1, the terminal T7 is maintained at low level.)

When the terminals T1 and T4 are at high level in this manner, signals 1FS, 7FS and 9FS are derived from the AND gate 2A and the driving of the paper feed roller 56 is resumed to prefeed the next sheet of recording paper, and the forward stroke of the optical head 9 and of the recording head 8 is started.

The count content of the counter 150 advances by an increment each time the leading end of the recording paper 55 wrapped around the drum 63 is detected by the switch SW2, but any other variation does not occur (This time is the preparatory running period of the recording head 8 and the optical head 9). When the leading end of the recording paper 55 is detected a times by the switch SW2 in this manner, the terminal 152 assumes high level, the flip-flop 154 is reset, the gate 159 is opened and the output of the switch SW2 (read-out synchronizing signal) is applied to the AND gates 160–163. Since, however, only the AND gate 161 to which the output of the terminal T4 is applied is opened, the read-out synchronizing signal is applied to the clock deriving circuit 167 and the gate circuit 169 through the AND gates 159, 161 and the OR gate 164.

Thus, each time the read-out synchronizing signal is applied, 2100 clock signals are applied to the light-receptor 72 and the address circuit 170 of the memory 166. By such application of the clock signals, the image element signals read out from the light-receptor 72 are applied to the ink jet nozzle 88 and stored in the memory 166.

During the while the switch SW2 is repetitively closed in this manner, the leading end of the pre-fed recording paper 55 arrives at the switch SW1. The switch SW1 is closed when a high level signal is being derived at T4, whereby signals 1FR and 2FR are derived from the AND gate 3A to stop the driving of the paper feed roller 56 and the timing rollers 10. In other words, the apparatus stands by with the timing rollers 10 nipping the recording paper 55 to be used for the next cycle of recording.

When 3000 read-out synchronizing signals are derived from the OR gate 164, the recording onto the recording paper 55 is completed. Such completion of the recording can be detected by a high level signal being derived at the terminal T2 of the counter 150. When the terminal T2 thus assumes high level, signals 3FR, 4FR, 7FR, 9FR and 10FS are derived from the AND gate 4A to turn off the lamp 36, stop the pump 83 from operating, stop the forward movement of the optical head 9 and of the recording head 8 and start the backward movement of these heads. During the backward movement of the recording head 8, the return of the recording head 8 to its home position is detected by a switch SW5, whereby the flip-flop 10F is reset.

By the drum 63 rotating when the suction of the drum 63 is stopped, the recording paper 55 so far wrapped around the drum 63 is discharged between the guide plates 62-1 and 114 through the opening 65 and, by the switch SW3 detecting the trailing end of such discharged recording paper 55, the AND gate 5A is operated to derive signals 4FS and 2FS. Accordingly, the timing rollers 10 start to be driven and the pre-fed recording paper 55 nipped between the timing rollers 10 is transported into the opening 65 along the guide plates 62-1 and 62-2 while, at the same time, the interior of the drum 63 is again rendered to a negative pressure.

The second recording paper 55 fed in this manner is adsorbed to the drum 63 and the leading end thereof is detected by the switch SW2, whereby a high level signal is derived at the terminals 151 and T1 of the counter 150 to set the flip-flop 154 and increment the counter 155, so that the counted number of the counter 155 becomes "2".

Thus, a high level signal is derived from the discriminator 156 to the terminal T5. When a high level signal is so derived at the terminals T1 and T5, signals 9FS and 1FS are derived from the AND gate 6A to forwardly move the recording head 8 and derive the paper feed roller 56 so as to pre-feed a third sheet of recording paper.

The leading end of the recording paper 55 thus prefed is detected by the switch SW1, whereby signals 1FR and 2FR are derived from the AND gate 7A to stop the driving of the paper feed roller 56 and of the timing rollers 10.

On the other hand, the leading end of the recording paper 55 wrapped around the drum 63 closes the switch SW2 each time the drum 63 makes one full rotation, but the AND gate 159 is not opened until the switch SW2 is closed a times and, only when the switch SW2 has been closed 9 times, the flip-flop 154 is reset to open the gate 159. Since the terminal T5 is at high level as already noted, the AND gate 162 is opened for the execution of the second copy and a read-out synchronizing signal is derived from the OR gate 165.

Accordingly, each time the switch SW2 is closed, the read-out synchronizing signal is applied to the clock deriving circuit 167 and the gate 171 and 2100 clock signals are applied to the address circuit 170, so that, during the first copying, the image element signals stored in the memory 166 are read out and the read-out image element signals are applied through the gate circuit 171 to the ink jet nozzle 88. (The recording address circuit 170 has been returned to its initial address by the output of the switch SW3 which detects the discharge of the recording paper 55 from the drum 63.)

Since the gate circuit 169 is closed, the read-out of the light-receptor 72 is not effected and therefore, the recording is effected by the image element signals in the memory 166 which are successively read out.

That is, during the second copying and so on, the recording is effected not by the image element signals from the light-receptor 72 but by the image element signals written into the memory 166 during the first copying.

In this manner, the read-out synchronizing signal is derived from the OR gate (165)3000 times, whereby the recording of all the information stored in the memory 166 is terminated and at the termination of such recording, a high level signal is derived at the terminal T2.

When high level signals are derived at the terminals T2 and T5, the AND gate 8A is operated to derive signals 4FR, 9FR and 10FS and stop the pump 83 and stop the forward movement of the recording head 8 and effect the backward movement thereof.

Upon stoppage of the pump 83, the recording paper 55 is discharged and the trailing end of the discharged recording paper 55 is detected by the switch SW3, whereupon the AND gate 9A is operated to derive signals 4FS and 2FS and drive the pump 83 and also the timing rollers 10, thus starting to transport a third sheet of recording paper nipper between the timing rollers 10.

When the third sheet of recording paper 55 is wrapped around the drum 63 and the leading end thereof is detected by the switch SW2, the terminals 151 and T1 of the counter 150 assume high level and the count content of the counter 155 becones "3" and a high level signal is derived at the terminal T6 of the discriminator 156.

By the terminals T1 and T6 assuming high level, signal 9FS is derived from the AND gate 10A to start the forward movement of the recording head 8.

Since this recording paper is the last one of the set number of sheets, the pre-feeding of the recording paper 55 is not effect unlike the first and the second copying.

When the switch SW2 is closed a times, the flip-flop 154 is reset to open the AND gate 159. Since a high level signal is being derived at the terminal T6, the AND gate 163 is opened to derive a read-out synchronizing signal through the OR gate 165. Accordingly, as in the case of the second copying, the content of the memory 166 is read out and applied to the ink jet nozzle 88. When the read-out synchronizing signal is derived 3000 times in this manner and all the information within the memory 166 has been recorded, the terminal T2 assumes high level. By the terminals T2 and T6 assuming high level, signals 9FR, 10FS, 8FS and 4FS are derived from the AND gate 11A to stop the forward movement of the recording head 8 and effect the backward movement thereof, backwardly move the optical head 9, stop the pump 83 and discharge the recording paper 55.

At the termination of the last copy of the so set number of sheets, the optical head 9 stopped at its end position opposite to the home position HP is moved backwardly.

The trailing end of the discharged recording paper is detected by the switch SW3, whereby the AND gate 12A is operated to clear the counter 155.

When the switch SW4 detects the arrival of the backwardly moved optical head 9 at its home position, the AND gate 13A is operated to derive signals 5FR and 6FR and stop the energization of the drum motor and of the solenoid 112.

Since the velocity of the backward movement of the optical head 9 is slower than that of the recording head 8, all the movable members have been returned to their initial positions by the time when the optical head 9 arrives at its home position.

The copying when N>1 is carried out in the manner described above, and the copying when N=1 will now be described further by reference to FIGS. 9 and 10.

If N=1 is set by the setting device 157, a high level signal is derived at the terminal T7 of the discriminator 158 and the discriminator 156 is controlled so as not to be operated and therefore, no output is derived at the terminals T4, T5 and T6 irrespective of the content of the counter 155

First, when the copy switch CSW is depressed, signals 1FS, 2FS, 3FS, 4FS, 5FS and 6FS are derived and, when the leading end of the recording paper 55 is detected by the switch SW1, signal 1FR is derived from the AND date 1A, as already noted.

When the leading end of the recording paper 55 is detected by the swith SW2, the AND gate 14A is operated to derive signals 7FS and 9FS and start the forward movement of the optical head 9 and of the recording head 8.

When the switch SW2 is closed a times, the flip-flop 154 is reset to open the gate 159 and a read-out synchronizing signal is derived through the AND gate 160 and the OR gate 164.

Accordingly, the read-out synchronizing signal is applied to the clock deriving circuit 167 and the gate circuit 169 and in the same manner as the case of the first copying when N>1, the image element signals read out from the light-receptor 72 are applied to the memory 166 and the ink jet nozzle 88.

When the derivation of 3,000 read-out synchronizing signals is terminated in this manner, the terminal T2 of the counter 150 assumes high level and signals 3FR, 4FR, 7FR, 8FS, 9FR and 10FR are derived from the AND gate 15A.

Thus, the lamp 36 is turned off, the pump 83 is stopped, the optical head 9 stops its forward movement and starts its backward movement, and the recording head 8 stops its forward movement and starts its back movement.

By the switch SW3 detecting the trailing end of the so discharged recording paper 55, the AND gate 16A is operated to clear the counter 155.

Next, the backwardly moving optical head 9 arrives at its home position, whereby the drum motor 77 is stopped and the solenoid 112 is deenerigized, thus stopping the copying operation.

The construction for masking the information on the original by means of pointers 18–21 will now be described by reference to FIG. 10.

In FIG. 10, the portion encircled by a dotted line is a mask circuit 175, the operation principle of which is such that the information on the section of which the masking has been instructed closes the gate circuit 176 to derive no signal from the light-receptor 72 to the ink jet nozzle 88 and the memory 166, thereby suppressing or masking a desired portion. Designated by 177 is a clock deriving circuit similar in construction to the clock deriving circuit 167. By the switch SW8 being closed during the preparatory running period of the optical head 9, the clock deriving circuit 177 applies 2100 clock signals to a 2100-bit shift register 178 and the light-receptor 72. By the switch SW8 being closed, the output of the light-receptor 72 is applied to the shift register 178 through a gate circuit 179 which is adapted to be open during the period of 2100 clocks and thus, in this shift register 178, the portion corresponding to the position of the reflector plates 52-1 and 52-2 when the switch SW8 has been closed is stored as logic "1" and the other portion is stored as logic "0". To make the description easily understood, it should be understood that the portion corresponding to the reflector plates 52 becomes logic "1" by 1 bit.

On the other hand, the output of the shift register 178 is connected to the set output of a flip-flop 180, and the set output of the flip-flop 180 and the output of the shift register 178 are connected to an AND gate 181, and the output of this AND gate 181 provides the reset input of the flip-flop 180. It should be understood that this flip-flop 180 is set or reset by the falling of an input signal.

Accordingly, if a clock pulse is applied to the shift register 178 to read out the content thereof after the shift register 178 has stored the position of the reflector plates 52, a high level signal may be obtained on a signal line 182 only when the information between the two reflector plates 52 is being read out.

Designated by 183 is a flip-flop. The output of the switch SW6 driven during the movement of the optical head 9 is applied to the set input of the flip-flop 183, and the output of the switch SW7 driven during the movement of the optical head 9 is applied to the reset input of the flip-flop 183. Accordingly, a high level signal is derived on the set output line 184 of the flip-flop 183 only between the switches SW6 and SW7.

The above-mentioned signal lines 182 and 184 are connected to an AND gate 185, the gate circuit 176 is controlled by the output of this AND gate 185 and the gate circuit 176 may be opened only when a high level signal is applied to the gate circuit 176, while the gate circuit 176 may be closed during the other time, whereby the masking of the portion indicated by the pointers 18-21 can be accomplished.

After the pointers 18-21 have been registered to desired positions, the copy start switch CSW may be depressed and, after the switch CSW has been depressed, the optical head 9 closes the switch SW8 during the preparatory running thereof. The reflector plates 52-1 and 52-2 indicating the positions of the pointers 18 and 19 are provided at the portion whereat the switch SW8 is closed, and if 2100 clock signals are applied to the light-receptor 72 at this position to read out the position of the reflector plates 52 and the output of this light-receptor 72 is stored in the shift register 178, the position of the reflector plates 52 will be stored in the shift register 178.

Thus, when the period during which the switch SW2 is closed has passed, the gate circuit 179 is closed and the application of the clock signals to the light-receptor 72 and the shift register 178 is stopped, and the content of the shift register 178 is maintained unchanged until a clock signal is derived from the clock deriving circuit 167.

When a read-out synchronizing signal is derived from the OR gate 164 and a clock signal is applied from the clock deriving circuit 167 to the light-receptor 72 and the address circuit 170, this clock signal is also applied to the shift register 178 by a signal line 186 and the content of the shift register 178 is read out in synchronism with the reading-out of the light-receptor 72. Since, as already described, the gate circuit 176 is opened only for a period of time corresponding to the period of time during which the information between the reflector plates 52-1 and 52-2 is read out, the light-receptor 72 puts out an output only during that period of time and applies it to the ink jet nozzle 88 and the memory 166.

Since the same clock signal as that applied to the light-receptor 72 is always applied to the shift register 178, the content of the shifter register 178 is also read out 3000 times of reading-out from the light-receptor 72 and the masking in the direction x is effected by such operation.

On the other hand, when the optical head 9 arrives at the position of the pointers 20 and 21 in the course of such movement of the optical head 9, ON signals are derived from the switches SW6 and SW7 and, since the flip-flop 183 is set by the closing of the switch SW6 and is reset by the closing of the swith SW7, the gate circuit 176 is opened only between the pointers 20 and 21 and the output of the light receptor 72 is applied to the ink jet nozzle 88 and the memory 166.

In short, only the information of the portion encircled by the pointers 18–21 is applied to the ink jet nozzle 88 and the memory 166 and therefore, the recording can be effected with the masking in the directions x and y being accomplished.

Even if the content of the memory 166 is read out and applied to the ink jet nozzle 88 during the second copying and so on, copies with the masking effected by the pointers 18–21 can be obtained in the same manner as the first copy because only the information with the masking applied thereto is stored in the memory 166.

In order to enable obtainment of non-masked copies when the masking is not desired, design may be made such that the pointers are movable to the outside of the area in which the original is placed.

The clearing of the shift register 178 and flip-flops 180 and 183 may be effected by the output of the AND gate 13A or 17A.

While the foregoing embodiments has been described with respect only to the case where the masking is effected in the directions x and y at the same time, design may of course be made such that the masking is effected in either of the directions x and y.

In the copying apparatus according to the present embodiment, the suction force of the pump 83 is controlled in accordance with the quality (self-support strength) and size of the recording paper to thereby control the negative pressure condition within the drum 63 so as to be a condition suited for sucking the recording paper and such negative pressure control will hereinafter be described.

Figure 12:
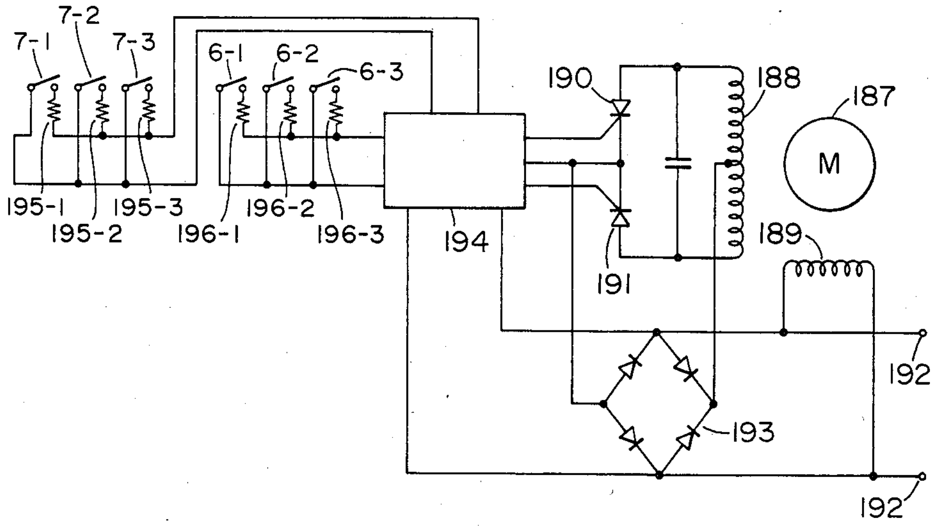
FIG. 12 is a diagram of a negative pressure control circuit.

Designated by 187 in FIG. 12 is the rotor of the motor for driving the pump 83. Stator windings 188 and 189 are provided in opposed relationship with the rotor 187.

An AC voltage of 100 V applied to a terminal 192 is rectified by a full-wave rectifier 193 and it is again converted into an AC voltage by SCR's 190, 191 and a variable voltage is applied.

Accordingly, this motor can have the torque thereof controlled by controlling the phase angle of a gate pulse applied to the SCR's 190 and 191 by a conventional trigger control circuit 194 and thus, the suction condition of the pump 83, in other words, the negative pressure condition within the drum 63 can be controlled.

One of resistors 195-1-195-3 or 196-1-196-3 may be connected to such trigger control circuit 194.

Switches 7-1 to 7-3 are paper size designating keys. That is, the switch 7-1 is the key for designating A4 size, the switch 7-2 is the key for designating B5 size, and the switch 7-3 is the key for designating A5 size. The resistance values of the resistors 195-1 to 195-3 are set so that 195-1>195-2>195-3.

If so constructed, the suction force when the key 7-2 is depressed will be stronger the suction force when the key 7-1 is depressed, and the suction force when the key 7-3 is depressed will be stronger than the suction force when the key 7-2 is depressed.

Also, if so constructed, the suction force can be made greater as the area of the recording paper wrapped around the drum 63 is smaller.

Accordingly, by suitably selecting the values of the resistors 195-1 to 195-3, the recording paper can be wrapped around the drum 63 in the same condition irrespective of the paper size.

Switches 6-1 to 6-3 are keys for designating the quality (self-support strength) of the paper. That is, the switch 6-1 is the key for designating soft paper, the switch 6-2 is the key for designating the normal quality of paper, and the switch 6-3 is the key for designating hard paper. The resistance values of resistors 196-1 to 196-3 are set so that 196-1>196-2>196-3.

If so constructed, the suction force when the key 6-2 is depressed will be stronger than the suction force when the key 6-1 is depressed, and the suction force when the key 6-3 is depressed will be stronger than the suction force when the key 6-2 is depressed.

Also, if so constructed, the suction force can be made greater as the self-support strength of the recording paper wrapped around the drum 63 is greater (as the paper is harder).

Accordingly, by suitably selecting the values of the resistors 196-1 to 196-3, the recording paper 55 can be wrapped around the drum 63 in the same condition irrespective of the quality of the paper.

While the foregoing embodiment has been described with respect only to the case where movable pointers are used, it is of course possible to construct the apparatus as one inherent to a copying apparatus (so that the fixed position may be masked with the pointers eliminated) to prevent the marginal portion of an original from presenting itself as a black line during the copying.

Also, conversely to the present embodiment, the apparatus may be designed such that the information between the pointers is masked as unnecessary information. According to the present invention, as has hitherto been described, simply by designating the portion to be masked by designating means, such portion can be eliminated from the information to be recorded and therefore, the operator can very easily effect the masking of a desired portion.

What we claim is:

1. A copying apparatus comprising:

electrical image element signal forming means for reading an original document image by a photoelectric converting member to form electrical image element signals;

memory means for storing a field of said electrical image element signals;

recording means for recording an image in response to said electrical image element signals provided by said image element signal forming means and provided by said memory means; and control means for controlling, in case of multi-sheet copying, said image element signals formed by said image element signal forming means for storage in said memory means as well as being applied to said recording means for the first sheet of copying, and from the second sheet of copying on, causing said image element signals accessed from said memory means to be applied to said recording means.

2. A copying apparatus according to claim 1, further comprising means for setting the number of copies of the image to be recorded by said recording means.

3. A copying apparatus according to claim 2, further comprising:

memory means for storing the number of copies set by said setting means, and determination means for determining whether the current copy is the first one.

4. A copying apparatus according to claim 1, wherein said memory means supplies the image signal stored therein to said recording means in accordance with timing signals associated with the recording operation of said recording means.

* * * * *

UNITED STATES PATENT AND TRADEMARK OFFICE
CERTIFICATE OF CORRECTION

PATENT NO. : 4,737,804

DATED : April 12, 1988

INVENTOR(S) : NAOKI AYATA, ET AL.

It is certified that error appears in the above-identified patent and that said Letters Patent is hereby corrected as shown below:

COLUMN 2

Line 54, "are" should read --is--.
Line 62, "bed 14" should read --bed 32--.

COLUMN 3

Line 6, "luster-scanning" should read --raster-scanning--.

COLUMN 5

Line 46, "cylinder 115" should read --cylinder 75--.

COLUMN 7

Line 64, "are" should read --is--.

COLUMN 10

Line 51, "flip-flops 1F" should read --flip-flop 1F--.

COLUMN 14

Line 27, "derive" should read --drive--.
Line 40, "9 times," should read --a times,--.

COLUMN 15

Line 14, "nipper" should read --nipped--.
Line 27, "effect" should read --effected--.

UNITED STATES PATENT AND TRADEMARK OFFICE

CERTIFICATE OF CORRECTION

PATENT NO. : 4,737,804

DATED : April 12, 1988

INVENTOR(S) : NAOKI AYATA, ET AL.

It is certified that error appears in the above-identified patent and that said Letters Patent is hereby corrected as shown below:

COLUMN 16

Line 7, "date 1A," should read --gate 1A,--.
Line 9, "swith SW2," should read --switch SW2,--.

COLUMN 18

Line 4, "swith SW7," should read --switch SW7,--.
Line 26, "embodiments" should read --embodiment--.
Line 62, "stronger the" should read --stronger than the--.

Signed and Sealed this

Sixth Day of June, 1989

*Attest:*

DONALD J. QUIGG

*Attesting Officer*

*Commissioner of Patents and Trademarks*